(12) United States Patent
Corke et al.

(10) Patent No.: US 8,640,995 B2
(45) Date of Patent: Feb. 4, 2014

(54) SYSTEM AND METHOD FOR AERODYNAMIC FLOW CONTROL

(75) Inventors: Thomas Corke, Granger, IN (US); Flint Thomas, Granger, IN (US); David Shatzman, South Bend, IN (US); Tommie Wood, Arlington, TX (US)

(73) Assignee: Textron Innovations Inc., Providence, RI (US)

(*) Notice: Subject to any disclaimer, the term of this patent is extended or adjusted under 35 U.S.C. 154(b) by 306 days.

(21) Appl. No.: 13/056,042

(22) PCT Filed: Jul. 31, 2009

(86) PCT No.: PCT/US2009/052442
§ 371 (c)(1),
(2), (4) Date: Jan. 26, 2011

(87) PCT Pub. No.: WO2010/014924
PCT Pub. Date: Feb. 4, 2010

(65) Prior Publication Data
US 2011/0120980 A1    May 26, 2011

Related U.S. Application Data

(63) Continuation-in-part of application No. 11/519,770, filed on Sep. 13, 2006, now Pat. No. 8,308,112.

(60) Provisional application No. 61/085,209, filed on Jul. 31, 2008, provisional application No. 60/726,648, filed on Oct. 17, 2005.

(51) Int. Cl.
*B64C 23/00* (2006.01)

(52) U.S. Cl.
USPC ........................................................ 244/205

(58) Field of Classification Search
USPC ........................... 244/201, 203, 204, 205, 207
See application file for complete search history.

(56) References Cited

U.S. PATENT DOCUMENTS

| 3,095,163 A | 6/1963 | Hill |
| 3,360,220 A * | 12/1967 | Meyer .......................... 244/205 |

(Continued)

FOREIGN PATENT DOCUMENTS

| EP | 1928216 A1 | 6/2008 |
| EP | 1937552 A2 | 7/2008 |

(Continued)

OTHER PUBLICATIONS

International Preliminary Report on Patentability in PCT/US09/52442, mailed Oct. 21, 2011.

(Continued)

*Primary Examiner* — Joseph W Sanderson
(74) *Attorney, Agent, or Firm* — James E. Walton

(57) ABSTRACT

A vortex generator system comprises one or more plasma streamwise vortex generators (PSVGs) or plasma wedge vortex generators (PWVGs). The PSVGs and PWVGs each comprises a first electrode and a second electrode separated by a dielectric layer. The first electrode extends in a longitudinal direction. The PSVGs and PWVGs can be installed on a surface arranged to receive airflow in a certain flow direction. The PSVGs have a rectangular first electrode is exposed and extends at least somewhat parallel to the expected flow direction, whereas the first electrode of the PWVGs is more triangular in shape. When an AC voltage is applied to the first and second electrodes, a plasma forms along edges of the first electrode. The plasma imposes a body force in a cross-flow direction, which induces a cross-flow velocity that, in combination with the mean flow, produces streamwise-oriented counter-rotating vortices.

20 Claims, 4 Drawing Sheets

(56) References Cited

U.S. PATENT DOCUMENTS

| | | | |
|---|---|---|---|
| 4,914,741 | A | 4/1990 | Brown et al. |
| 5,414,324 | A | 5/1995 | Roth et al. |
| 5,669,583 | A | 9/1997 | Roth |
| 5,938,854 | A | 8/1999 | Roth |
| 6,200,539 | B1 | 3/2001 | Sherman et al. |
| 6,247,671 | B1 | 6/2001 | Saeks et al. |
| 6,570,333 | B1 | 5/2003 | Miller et al. |
| 6,796,532 | B2 | 9/2004 | Malmuth et al. |
| 6,805,325 | B1 | 10/2004 | Malmuth et al. |
| 7,017,863 | B2 | 3/2006 | Scott et al. |
| 7,066,431 | B2 | 6/2006 | Scott et al. |
| 7,334,394 | B2 | 2/2008 | Samimy et al. |
| 7,380,756 | B1 | 6/2008 | Enloe et al. |
| 7,413,149 | B2 | 8/2008 | Minick et al. |
| 7,637,455 | B2 * | 12/2009 | Silkey et al. ............... 244/53 B |
| 8,006,939 | B2 * | 8/2011 | McClure et al. ............ 244/205 |
| 8,220,754 | B2 * | 7/2012 | McClure et al. ............ 244/205 |
| 8,226,047 | B2 * | 7/2012 | Gupta et al. ............. 244/199.3 |
| 2004/0118973 | A1 | 6/2004 | Malmuth |
| 2008/0023589 | A1 | 1/2008 | Miles |
| 2008/0067283 | A1 | 3/2008 | Thomas |
| 2008/0122252 | A1 | 5/2008 | Corke et al. |
| 2010/0308177 | A1 * | 12/2010 | McClure et al. ............ 244/205 |

FOREIGN PATENT DOCUMENTS

| | | |
|---|---|---|
| FR | 1031925 A | 6/1953 |
| WO | 9935893 A2 | 7/1999 |
| WO | 02081304 A | 10/2002 |
| WO | 2007133239 A2 | 11/2007 |

OTHER PUBLICATIONS

First Examination Report from Canadian Patent Office in related Canadian application No. 2,732,100, 2 pages, Dec. 10, 2012.
Search Report and Written Opinion in PCT/US09/52442, mailed Sep. 15, 2009.
Search Report and Written Opinion in PCT/US2006/032247, dated Oct. 25, 2007.
Huang, Junhui, Separation Control Over Low Pressure Turbine Blades Using Plasma Actuators, A Dissertation submitted to the Graduate School of the University of Notre Dame, Department of Aerospace and Mechanical Engineering, Apr. 2005, Notre Dame, Indiana.
Post, Martique L., Plasma Actuators for Separation Control on Stationary and Oscillating Airfoils, A Dissertation submitted to the Graduate School of the University of Notre Dame, Department of Aerospace and Mechanical Engineering, May 2004, Notre Dame, Indiana.
Amendment and RCE filed in U.S. Appl. No. 11/519,770, dated Feb. 16, 2010.
Amendment filed in U.S. Appl. No. 11/519,770, dated Aug. 24, 2010.
Response to Final Office Action filed in U.S. Appl. No. 11/519,770, dated Jan. 15, 2010.
Office Action in U.S. Appl. No. 11/519,770, dated Mar. 24, 2010.
Advisory Action in U.S. Appl. No. 11/519,770, dated Jan. 27, 2010.
Form PTOL-456 from Licensing and Review in U.S. Appl. No. 11/519,770, dated Oct. 13, 2006.
Response in U.S. Appl. No. 11/519,770, dated Nov. 22, 2006.
Office Action in U.S. Appl. No. 11/519,770, dated Mar. 30, 2009.
Office Action in U.S. Appl. No. 11/519,770, dated Oct. 15, 2009.
Office Action in U.S. Appl. No. 11/519,770, dated Nov. 17, 2010.
Amendment in U.S. Appl. No. 11/519,770, dated Jun. 30, 2009.
Amendment in U.S. Appl. No. 11/519,770, dated Feb. 17, 2011.
Advisory Action in U.S. Appl. No. 11/519,770, dated Feb. 25, 2011.
Martiqua L. Post, Plasma Actuators for Separation Control on Stationary and Oscillating Airfoils, a Dissertation submitted to the Graduate School of the University of Notre Dame, Department of Aerospace and Mechanical Engineering, May 2004, Notre Dame, Indiana; as submitted in related U.S. Appl. No. 11/519,770, filed Sep. 13, 2006.
Separation Control Over Low Pressure Turbine Blades Using Plasma Actuator; Huang, Junhui, Apr. 2005 retrieved from; http://etd.nd.edu/ETD-db/theses/available/etd-04152005-095454/unrestricted/HuangJ042005.pdf; as submitted in related U.S. Appl. No. 11/519,770, filed Sep. 13, 2006.
Partial European Search Report from the European Patent Office concerning related information in European Patent Application No. 2340995, Dec. 13, 2011.
Office Action in U.S. Appl. No. 11/519,770, dated Apr. 29, 2011, eleven (11) pages.
Supplementary European Search Report from the European Patent Office concerning related information in European Patent Application No. 09803664, Jan. 31, 2013.

* cited by examiner

SYSTEM AND METHOD FOR AERODYNAMIC FLOW CONTROL

TECHNICAL FIELD

The present application relates to vortex generators. In particular, the present application relates to vortex generators mounted to substantially continuous aerodynamic surfaces to energize boundary layer air to at least partially alleviate the onset of separated flow over the surfaces.

DESCRIPTION OF PRIOR ART

With proper design, streamwise vortex generators (SVGs), such as passive delta-shaped tabs, can generate longitudinal vortices that can be effective in maintaining attached flow over a surface, such as the wing of an aircraft. The disadvantage of passive devices like these is that such passive devices are always deployed, even when not needed. Under such circumstances passive SVGs add parasitic drag that lowers the efficiency of air vehicles on which they are used.

Hence, there is a need for improvements to vortex generator systems and processes.

DESCRIPTION OF THE PREFERRED EMBODIMENT

Figure 1:
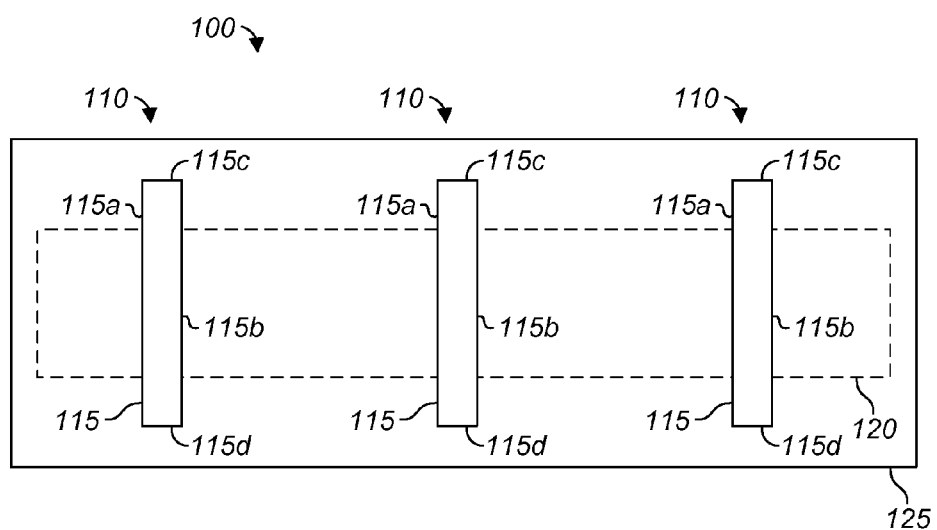
FIG. 1 shows a plan view of a vortex generator system.
Figure 2:
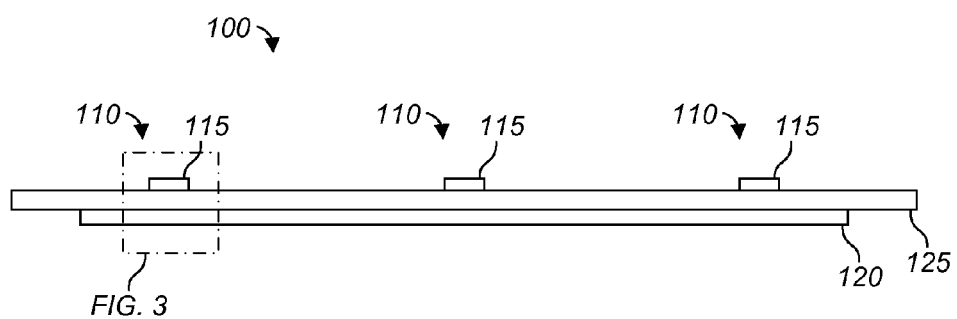
FIG. 2 shows a front view of the vortex generator system shown in FIG. 1.

Referring to FIGS. 1 and 2, FIG. 1 shows a plan view of a vortex generator system 100, and FIG. 2 shows a front view of the vortex generator system 100. The vortex generator system 100 comprises a plurality of plasma streamwise vortex generators (PSVGs) 110. While three PSVGs 110 are shown, alternative embodiments can include any number of PSVGs 110. PSVG 110 comprises a first electrode 115 and a second electrode 120 (shown in phantom in FIG. 1). PSVG 110 also includes a dielectric layer 125 disposed between the first and second electrodes 115 and 120. Although electrodes 115 are shown as extending from the surface of dielectric layer 125, it should be appreciated that the electrodes 115 can be formed of a relatively thin material, and/or can be provided in respective recesses in the surface of dielectric layer 125 so as to be partially or completely flush with the upper surface of dielectric layer 125. In some embodiments, the electrodes 115 can be exposed to the surrounding air. The distance between neighboring adjacent first electrodes 115 can vary. In some embodiments, the distance between adjacent first electrodes 115 can be, for example in a range of three to four times the boundary layer thickness.

The first and second electrodes 115 and 120 can be formed of electrically conductive material, for example copper or gold, which can be relatively thin, such as a copper foil or gold foil. The dielectric layer 125 can be formed of electrically insulating material, for example Kapton® polyimide film, a glass-ceramic such as MACOR®, or a thermoplastic such as Polyetheretherketone (PEEK). The thickness of the dielectric layer 125 is dependent on the maximum voltage that will be applied to the PSVG 110. It is contemplated that the dielectric layer 125 can include multiple layers of different material, including, for example, multiple types of dielectric materials. Also, while a single second electrode 120 is shown extending opposite multiple first electrodes 115, alternative embodiments can include multiple second electrodes 120 opposite single and/or multiple respective first electrodes 115.

Figure 3:
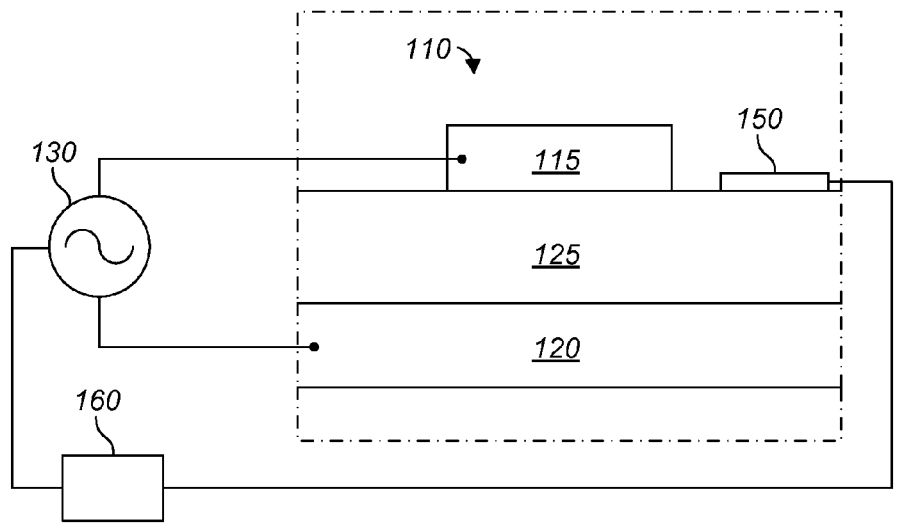
FIG. 3 shows an enlarged portion of FIG. 2.

Referring now also to FIG. 3, which includes an enlarged view of a portion of FIG. 2, each PSVG 110 includes a first electrode 115 and a second electrode 120 separated by a dielectric material 125. FIG. 3 also includes a schematic view of an alternating current (AC) voltage source 130, a pressure sensor 150, and a controller 160. The AC voltage source 130 is connected between the first and second electrodes 115 and 120. While a single AC voltage source 130 is shown directly connected to the electrodes 115 and 120, actual implementations can include any number of AC voltage sources 130 and can further include additional circuitry as required between the AC voltage source 130 and the electrodes 115 and/or 120. For example, control circuitry may be added to allow for controlling the application of AC voltage to the electrodes 115 and 120. Also, power conditioning circuitry may be desired, for example for damping voltage and/or current spikes. Also, voltage and/or current shaping circuitry may be desired for adjusting various characteristics of the applied voltage and/or current, such as amplitude and frequency. It is also contemplated that a direct current (DC) voltage source could be used in place of the AC voltage source 130, and the DC voltage converted to AC voltage according to known methods.

Figure 4:
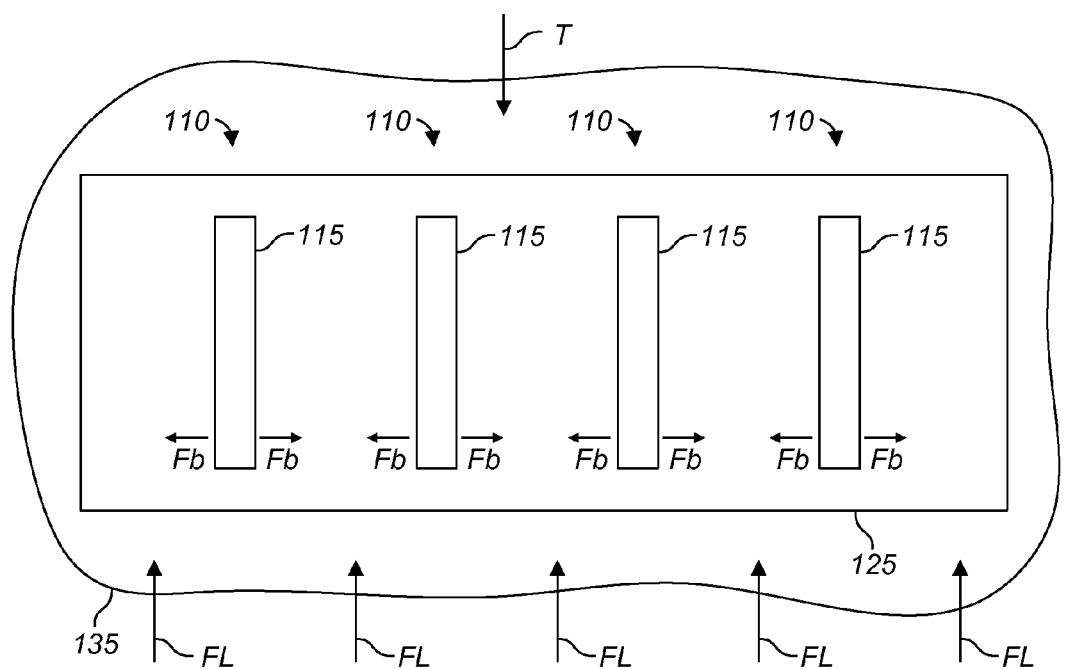
FIG. 4 shows a plurality of plasma streamwise vortex generators supported by a surface.

Referring now also to FIG. 4, a plan view shows a plurality of PSVGs 110 and a portion of a surface 135 that supports the PSVGs 110. While four PSVGs 110 are shown in FIG. 4, alternative embodiments can include any number of PSVGs 110. Note that the second electrode 120 is not shown in FIG. 4 since it is obscured by the dielectric layer 125. The surface 135 can be, for example, a portion of an aerodynamic surface. For example, in applications related to aviation, the surface 135 can a portion of a surface of an airfoil, fuselage, tail boom, wing, rotor, rotating wing, nacelle, or any other surface that produces drag. Further applications in other industries, for example the automotive and rail industries, can also utilize the vortex generator system.

The surface 135 is preferably unswept; for example, surface 135 can be a portion of an unswept wing of an aircraft. The surface 135 is arranged such that air typically flows in the airflow direction indicated by arrows FL. For example, the surface 135 can be the upper surface of an aircraft wing where the aircraft is designed to fly in the direction indicated by arrow T, which results in the airflow direction indicated by arrows FL. The first electrodes 115 are somewhat rectangular, or at least have opposing lengthwise edges 115a and 115b that extend in a generally longitudinal direction that is at least somewhat parallel to the airflow direction indicated by arrows FL and the direction of travel indicated by arrow T. The widthwise edges 115c and 115d can be somewhat straight as shown, or can be more rounded. For reasons that will be better understood based on the description below, it is desirable to arrange the PSVGs 110 such that their first electrodes 115 extend in a direction that is at least somewhat parallel to expected airflow. For embodiments where a surface is expected to be subject to airflow in more than one direction, it is contemplated that a first group of PSVGs 110 can be arranged such that the first electrodes 115 extend in a direction parallel to a first expected airflow direction, a second group of PSVGs 110 can be arranged such that the first electrodes 115, or at least the lengthwise edges 115a and 115b, extend in a direction parallel to a second expected airflow direction, and so on for any number of groups of PSVGs 110 and respective airflow directions.

Figure 5:
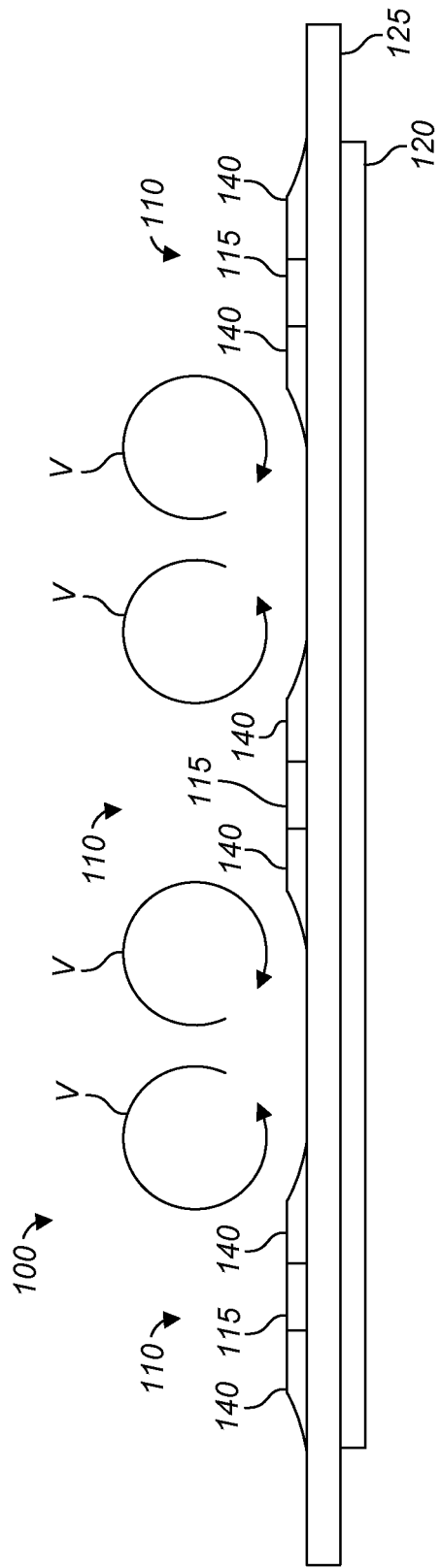
FIG. 5 shows an enlarged view of FIG. 2 when the vortex generator system is activated.

Referring now also to FIG. 5, an enlarged view of FIG. 2 is shown with the AC voltage source 130 activated. When the AC voltage source 130 is activated, a voltage differential is created between the first and second electrodes 115 and 120, causing the creation of plasma 140 along the longitudinal edges of the first electrodes 115. Further details of the generation of the plasma 140 are provided in copending U.S. patent application Ser. No. 11/519,770, filed on 13 Sep. 2006, and titled "Plasma Actuators for Drag Reduction on Wings, Nacelles and/or Fuselage of Vertical Take-Off and Landing Aircraft," which is hereby incorporated by reference. The AC voltage source 130 can be operated according to methods described in therein, for example, the AC voltage source 130 configured to apply voltage between the first and second electrodes 115 and 120 at a steady frequency or at an unsteady frequency.

The respective longitudinal axis of each first electrode 115 is oriented in the mean flow direction (indicated by arrow FL in FIG. 4) in an arrangement that generates body forces in the cross-flow directions Fb as indicated in FIG. 4. With the PSVGs 110 located on the surface over which a flow is passing, the cross-flow oriented body force causes the flow downstream to roll up into single co-rotating, or pairs of counter-rotating, streamwise-oriented vortices as indicated by arrows V in FIG. 5. The vortices V are similar to those produced by passive SVGs. However, the PSVGs 110 can be operated only when needed. For example, PSVGs 110 can be selectively activated by selective application of AC voltage to the first and second electrodes 115 and 120. Also, PSVGs 110 can be made flush with the surface 135 so that they do not add parasitic drag.

Finally, being actively controllable devices, the PSVGs 110 can be optimally operated as flow conditions change, providing better efficiency in all applications. For example, the PSVGs 110 can be automatically activated, adjusted, and/or otherwise controlled based on, for example, flight conditions and/or other detected conditions. For example, pressure sensors 150 on the surface 135 (which, in some embodiments, can coincide with the upper surface of dielectric 125 as shown in FIG. 3) can be used to detect airflow separation from the surface 135 and the PSVGs 110 can be automatically activated by controller 160 when undesirable flow separation occurs, and automatically deactivated by controller 160 when not needed, for example once correction of flow separation ceases to be necessary. The controller 160 can be any type of control system, computer, processing system, or the like, capable of receiving information from one or more pressure sensors 150 and controlling voltage to the PSVGs 110 based on the information received from the pressure sensors 150. It should be appreciated that, while the controller 160 is shown in schematic view in FIG. 3 as controlling the voltage source 130 directly, in alternative embodiments, the controller 160 can control a switch, relay, or the like between the voltage source 130 and one or more of the PSVGs 110.

The PSVGs 110 can be used, for example, to benefit the flow over the wings, wing fairings and fuselage of aircraft that are prone to flow separation.

The PSVGs 110 disclosed herein include a first electrode 115, which can be an exposed electrode, overlaying a second electrode 120, which can be common to multiple PSVGs 110, and which is covered by a dielectric layer 125. The electrodes are oriented so that the actuator body force vectors, Fb, are in the cross-flow direction away from each side of a first electrode 115. Each of the body force components induces a cross-flow velocity that, in combination with the mean flow, produces streamwise-oriented counter-rotating vortices. Further downstream, these develop into a pair of streamwise vortices with counter-rotating circulation that is identical to that produced by conventional delta tabs.

Figure 6:
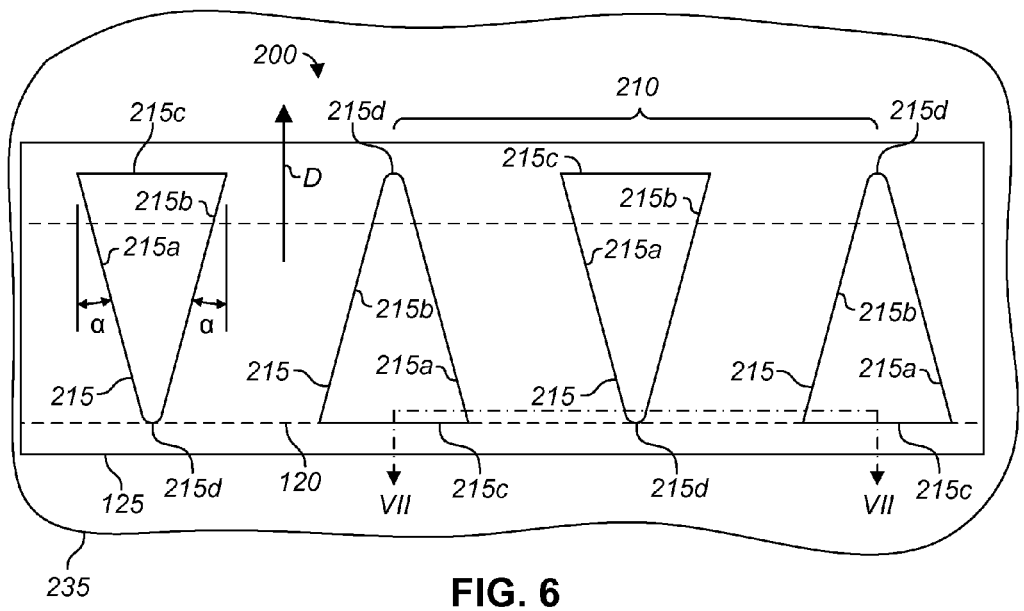
FIG. 6 shows a plan view of an alternative vortex generator system that includes plasma wedge vortex generators.
Figure 7:
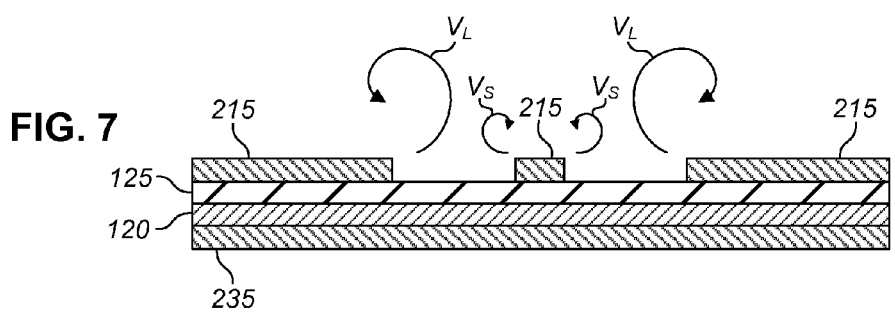
FIG. 7 shows a cross-sectional view taken along section line VII-VII in FIG. 6.
Figure 8:
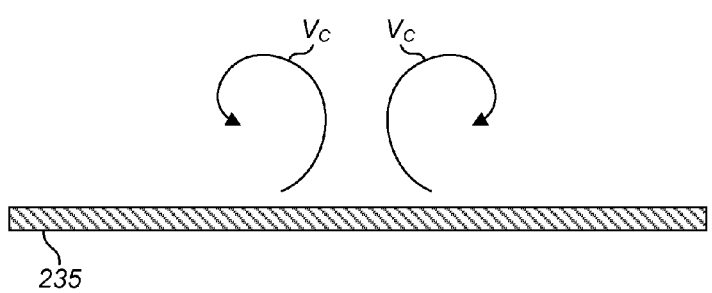
FIG. 8 shows a cross-sectional view taken downstream of the cross-sectional view shown in FIG. 7.

Turning next to FIGS. 6-8, an alternative vortex generator system is shown and is generally designated as element 200. FIG. 6 shows a plan view of the plasma vortex generator system 200. FIG. 7 shows a cross-sectional view taken along section lines VII-VII in FIG. 6. FIG. 8 shows a second cross-sectional view taken downstream from the view in FIG. 7.

The vortex generator system 200 is similar to vortex generator system 100, but differs at least in that vortex generator system 200 includes at least one Plasma Wedge Vortex Generator (PWVG) 210 instead of PSVGs 110. It should be appreciated that embodiments of the vortex generator system 200 can include any number of PWVGs 210. The PWVG 210 differs from the PSVG 110 in that the PWSG 210 has a wedge-shaped first electrode 215 in place of the more rectangular first electrode 115 of the PSVG 110. Like PSVG 110, the PWVG 210 also comprises a second electrode 120 (shown in phantom in FIG. 6) and a dielectric layer 125 disposed between the first and second electrodes 215 and 120. The second electrode 120 and dielectric layer 125 can be substantially similar to those described above, and have therefore retained the same element numbers.

The PWVGs 210 are shown disposed on a surface 235. PWVGs are desirable for applications where the surface 235 is "swept" (in contrast to the preferably unswept surface 135). For example, surface 235 can be a portion of a forward or rearward swept wing of an aircraft. The surface 235 has a generally downstream direction D, the exact angle of which will vary depending on the sweep angle of the wing (or other structure) that comprises surface 235. So, for example, if surface 235 is a portion of a wing, the arrow D points towards the rear of the wing.

Each wedge-shaped first electrode 215 has opposing lengthwise edges 215a and 215b that are some angle α from the longitudinal axis of the first electrode 215 as shown in FIG. 6. The angle α can be any desired angle that is selected based on cross-flow conditions, for example depending on the degree to which a wing is swept (e.g., the angle between the wing and the fuselage of an aircraft). For example, angle α can be in a range of 5 to 20 degrees. It is also preferred that the respective orientations of the wedge-shaped first electrodes 215 alternate as shown in FIG. 6, i.e., the tip 215d of every other first electrode 215 points in the generally-downstream direction, while the tip 215d of interposing first electrodes 215 point generally upstream. Each wedge-shaped first electrode 215 also has a widthwise edge 215c and a tip 215d. The widthwise edge 215c can be straight, as shown in FIG. 6, or can be more rounded. The tip 215d (as well as other corners of first electrodes 115 and 215) is preferably rounded rather than pointed, as sharp points tend to concentrate electric field lines.

Although first electrodes 215 are shown in FIG. 7 as extending from the surface of dielectric layer 125, it should be appreciated that the first electrodes 215 can be formed of a relatively thin material, and/or can be provided in respective recesses in the surface of dielectric layer 125, so as to be partially or completely flush with the upper surface of dielectric layer 125 and surface 135. In some embodiments, the electrodes 215 can be exposed to the surrounding air. The distance between neighboring adjacent first electrodes 215 can vary. In some embodiments, the distance between adjacent first electrodes 215 can be, for example in a range of three to four times the boundary layer thickness. The spacing can depend on the amount of voltage that will be applied between the first and second electrodes 215 and 120. The amount of voltage will, in turn, depend on the typical or maximum expected airspeed that will be passing over surface 235, because the amount of applied voltage affects the amount of flow control authority of the vortex generator system 200.

The first and second electrodes 215 and 120 can be formed of electrically conductive material, for example copper or gold, which can be relatively thin, such as a copper foil or gold foil. The dielectric layer 125 can be formed of electrically insulating material, for example Kapton® polyimide film, a glass-ceramic such as MACOR®, or a thermoplastic such as Polyetheretherketone (PEEK). The thickness of the dielectric layer 125 is dependent on the maximum voltage that will be applied to the PWVG 210. It is contemplated that the dielectric layer 125 can include multiple layers of different material, including, for example, multiple types of dielectric materials. Also, while a single second electrode 120 is shown extending opposite multiple first electrodes 215, alternative embodiments can include multiple second electrodes 120 opposite single and/or multiple respective first electrodes 215.

Referring back to FIG. 3, it should be appreciated that an alternating current (AC) voltage source 130, a pressure sensor 150, and a controller 160 can be used with PWVGs 210 in substantially the same manner as described above in connection with PSVGs 110. The AC voltage source 130 can be connected between the first and second electrodes 215 and 120.

Referring now to FIGS. 7 and 8, when the AC voltage source 130 is activated, a voltage differential is created between the first and second electrodes 215 and 120, causing the creation of plasma along the longitudinal edges 215a and 215b of the first electrodes 215 in a similar manner as described above and shown in FIG. 5. As mentioned above, further details of the generation of the plasma are provided in copending U.S. patent application Ser. No. 11/519,770, filed on 13 Sep. 2006, and titled "Plasma Actuators for Drag Reduction on Wings, Nacelles and/or Fuselage of Vertical Take-Off and Landing Aircraft," which is incorporated herein by reference. The AC voltage source 130 can be operated according to methods described in therein, for example, the AC voltage source 130 configured to apply voltage between the first and second electrodes 215 and 120 at a steady frequency or at an unsteady frequency.

With the PWVGs 210 located on the surface 235 over which a flow is passing, the cross-flow oriented body force causes the flow downstream to roll up into single co-rotating, or pairs of counter-rotating, streamwise-oriented vortices as indicated by arrows $V_L$ and $V_S$ in FIG. 7. The size of the vortices is related to the width of the electrode 215, so at the section shown in FIG. 7, the vortices $V_L$, which are generated closer to the wide base edges 215c of the outer two electrodes 215, are larger than the vortices $V_S$, which are generated closer to the narrower tip 215d of the center electrode 215. As shown in FIG. 8, the larger vortices eventually engulf the smaller vortices downstream (in the general direction of arrow D shown in FIG. 6), producing a pair of counter-rotating vortices $V_C$.

Like PWVGs 110, the PWVGs 210 are actively controllable devices, and therefore the PWVGs 210 can be optimally operated as flow conditions change, providing better efficiency in all applications. For example, the PWVGs 210 can be automatically activated, adjusted, and/or otherwise controlled based on, for example, flight conditions and/or other detected conditions. For example, pressure sensors 150 on the surface 235 can be used to detect airflow separation from the surface 235 and the PWVGs 210 can be automatically activated by controller 160 when undesirable flow separation occurs, and automatically deactivated by controller 160 when not needed, for example once correction of flow separation ceases to be necessary. The controller 160 can be any type of control system, computer, processing system, or the like, capable of receiving information from one or more pressure sensors 150 and controlling voltage to the PWVGs 210 based on the information received from the pressure sensors 150. It should be appreciated that, while the controller 160 is shown in schematic view in FIG. 3 as controlling the voltage source 130 directly, in alternative embodiments, the controller 160 can control a switch, relay, or the like between the voltage source 130 and one or more of the PWVGs 210.

The PWVGs 110 can be used, for example, to benefit the flow over the wings, wing fairings and fuselage of aircraft that are prone to flow separation.

The PWVGs 210 disclosed herein include a first electrode 215, which can be an exposed electrode, overlaying a second electrode 120, which can be common to multiple PWVGs 210, and which is covered by a dielectric layer 125. The electrodes 215 are oriented so that the actuator body force vectors, Fb, are in the cross-flow direction away from each side of a first electrode 215. Each of the body force components induces a cross-flow velocity that, in combination with the mean flow, produces streamwise-oriented counter-rotating vortices that vary in size depending on the width of the electrode 215. Further downstream, these vortices develop into a pair of streamwise vortices with counter-rotating circulation.

It is apparent that an invention with significant advantages has been described and illustrated. Although the present application is shown in a limited number of forms, it is not limited to just these forms, but is amenable to various changes and modifications without departing from the spirit thereof.

The invention claimed is:

1. A vortex generator system for use with a surface, the surface being configured such that an airflow passes over the surface in a predetermined airflow direction, the system comprising:
   a first electrode and a third electrode, both the first and the third electrode having a length dimension and a width dimension, the width dimension being less than the length dimension,
   wherein the length dimension extends in a longitudinal direction that is substantially parallel to the predetermined airflow direction;
   a second electrode underlaying the first electrode and the third electrode;
   a dielectric layer disposed between the first and second electrodes and between the third and second electrodes; and
   a voltage source for producing a voltage simultaneously between the first electrode and the second electrode, and between the third electrode and the second electrode, such that a plasma forms along the lengthwise edge of the first electrode and the third electrode so as to produce a streamwise-oriented vortex between the first and third electrodes in a mean flow direction.

2. The system according to claim 1, wherein the first electrode and the third electrode each have a lengthwise edge extending substantially parallel to the longitudinal direction.

3. The system according to claim 1, wherein the first electrode has a lengthwise edge extending at an angle relative to the longitudinal direction, wherein the angle is in a range of five to twenty degrees.

4. The system according to claim 1, wherein the surface is provided on an airfoil.

5. The system according to claim 1, wherein at least one of the first and second electrodes includes at least one of copper and gold.

6. The system according to claim 1, wherein the dielectric layer includes at least one of a polyimide material, a ceramic material, and a thermoplastic material.

7. The system according to claim 1, further comprising a pressure sensor for detecting airflow separation from the surface.

8. The system according to claim 7, wherein the voltage source is controlled to produce the voltage between the first electrode and the second electrode, and between the third electrode and the second electrode, when airflow separation is detected by the pressure sensor.

9. The system according to claim 1, wherein the first electrode is rectangular.

10. The system according to claim 1, wherein the first electrode is triangular.

11. A method of generating a vortex over a surface, the surface being configured such that an airflow passes over the surface in a predetermined airflow direction, the method comprising:
    simultaneously producing voltage between a first electrode and a second electrode, and between a third electrode and the second electrode, such that a plasma forms along a lengthwise edge of the first electrode and the third electrode so as to produce a streamwise-oriented vortex between the first and third electrodes in a mean flow direction, the first electrode and the third electrode overlaying the second electrode;
    wherein a dielectric layer is disposed between the first and second electrodes, and between the third and second electrodes;
    wherein both the first electrode and the third electrode have a length dimension and a width dimension, the width dimension being less than the length dimension; and
    wherein the length dimension extends in a longitudinal direction that is substantially parallel to the predetermined airflow direction.

12. The method according to claim 11, wherein the lengthwise edge of the first electrode and the third electrode extends substantially parallel to the longitudinal direction.

13. The method according to claim 11, wherein the first electrode has a lengthwise edge extending at an angle relative to the longitudinal direction, wherein the angle is in a range of five to twenty degrees.

14. The method according to claim 11, wherein the surface is provided on an airfoil.

15. The method according to claim 11, wherein at least one of the first and second electrodes includes at least one of copper and gold.

16. The method according to claim 11, wherein the dielectric layer includes at least one of a polyimide material, a ceramic material, and a thermoplastic material.

17. The method according to claim 11, further comprising detecting airflow separation from the surface.

18. The method according to claim 17, wherein the producing of the voltage includes producing the voltage between the first electrode and the second electrode, and between the third electrode and the second electrode, when airflow separation is detected.

19. The method according to claim 11, wherein the first electrode is rectangular.

20. The method according to claim 11, wherein the first electrode is triangular.

* * * * *